Sept. 26, 1944.     H. C. KRAPF     2,359,123
CONTROL SYSTEM
Filed Nov. 10, 1943
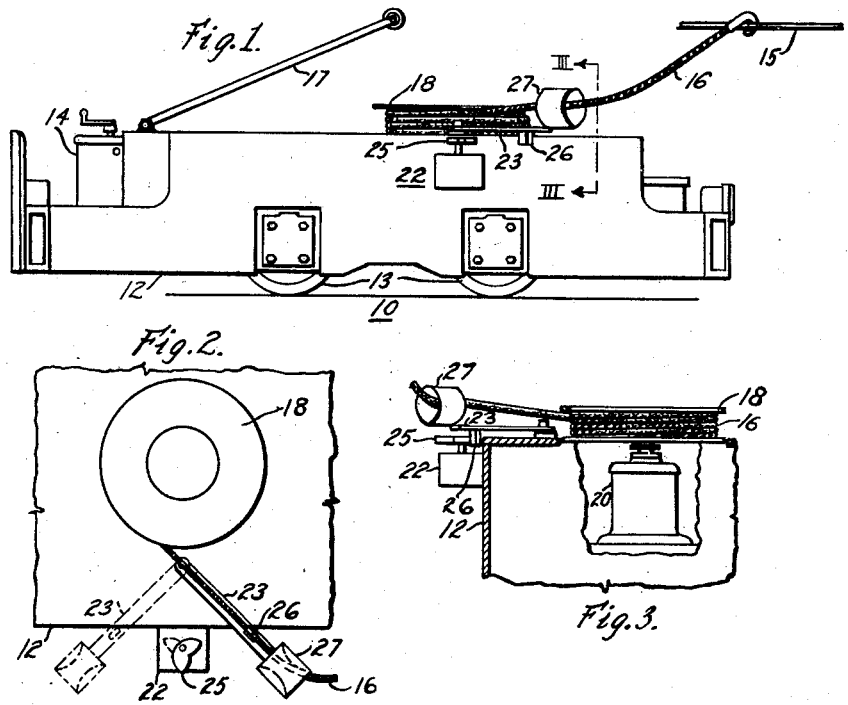
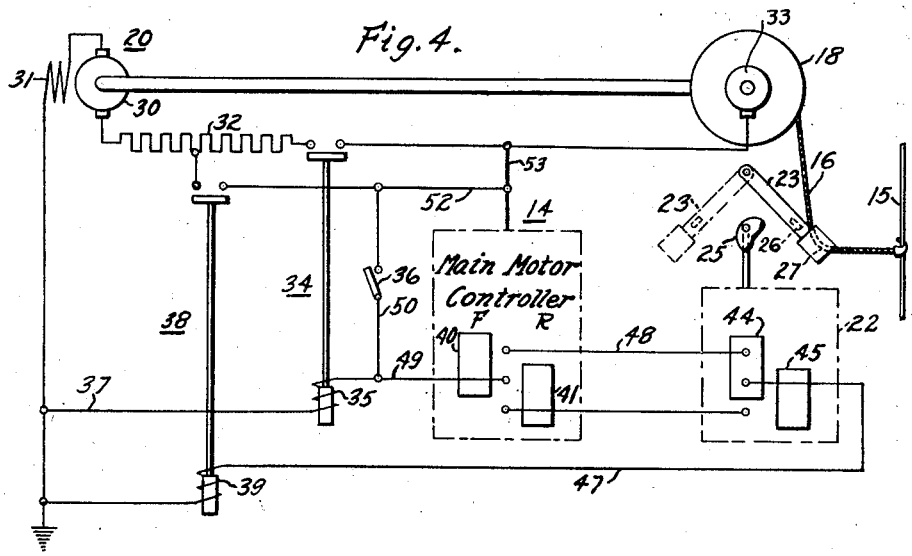
WITNESSES:
INVENTOR
Herman C. Krapf.
BY
ATTORNEY Patented Sept. 26, 1944

2,359,123

UNITED STATES PATENT OFFICE 2,359,123

CONTROL SYSTEM

Herman C. Krapf, Wilkinsburg, Pa., assignor to Westinghouse Electric & Manufacturing Company, East Pittsburgh, Pa., a corporation of Pennsylvania Application November 10, 1943, Serial No. 509,691

11 Claims. (Cl. 191—12)

My invention relates generally to control systems, and it has reference in particular to cable reel control systems for electric cable-operated machines, such, for example, as mining locomotives and the like.

Generally stated, it is an object of my invention to provide a control system for a motor drum cable reel which is simple and inexpensive to manufacture and is flexible in operation.

More specifically, it is an object of my invention to provide for maintaining proper tension on the cable of a motor driven cable reel under different operating conditions of the vehicle carrying the cable reel.

It is another object of my invention to provide for changing the torque of the driving motor of a cable reel whenever the vehicle on which it operates moves from one side to the other of the point of connection of the cable to a source of electrical energy.

It is also an object of my invention to provide for changing the torque of the driving motor of a cable reel in response to a change in the angular relation of the cable relative to the reel.

Still another object of my invention is to provide for controlling the torque of the driving motor of a cable reel on a cable-operated vehicle depending on whether the vehicle operates on one side or the other of the point of attachment of a cable to the source, or whether it operates in opposite directions on either side of the point of attachment.

Yet another object of my invention is to provide for controlling the torque of the driving motor of a cable reel by means of a variable position guide which is actuated by the cable.

A further object of the invention is to provide for selectively controlling the torque of the driving motor of a cable reel in accordance with the operating position of the vehicle motor controller, and in accordance with the position of a cable guide which is positioned in accordance with the direction of cable lead relative to the reel, so as to maintain a substantially constant tension on the cable.

Other objects will, in part, be obvious, and will, in part, be described hereinafter.

In accordance with my invention, the driving motor for the cable reel on a locomotive which operates alternately on one side or the other of the point of attachment of the cable to a source of electrical energy is controlled so as to provide a substantially constant tension on the cable. The torque of the motor is controlled by varying the amount of resistance in the armature circuit thereof by switch means which operate both in accordance with the operating position of the controller for locomotive motor and the relative position of a pivotal guide arm through which the cable passes, and which swings through an arc as the angular position of the cable relative to the reel changes when the locomotive passes the point of attachment of the cable to the source.

For a more complete understanding of the nature and scope of my invention, reference may be made to the following detailed description which may be studied in connection with the accompanying drawing, in which:

Figure 1 is a side elevational view of a mining locomotive embodying the principal features of the invention.

Fig. 2 is a partial plan view of the locomotive shown in Fig. 1.

Fig. 3 is a partial view of the locomotive of Fig. 1 taken along the line III—III, of Figure 1, and Fig. 4 is a diagrammatic view of a control system for the motor driven cable reel of the locomotive shown in Fig. 1.

Referring to Fig. 1, the reference numeral 10 may denote, generally, an electrically operated machine or vehicle such as a mining locomotive, comprising a frame 12 mounted on wheels 13. The locomotive may be provided with suitable driving or traction motors (not shown) for driving the wheels 13 the operation of which may be controlled by a suitable controller 14. Electrical energy may be supplied thereto from a suitable power source through an overhead conductor 15 by means of a flexible cable 16 or a trolley type of current collector 17, depending on the particular operating conditions in the area where the vehicle is operating.

Since the cable 16 is often used for supplying electrical energy to the traction motors when the locomotive is operating in or along a sliding or other portions of a mine, where no overhead conductor is available, means such as the cable reel 18 may be provided for paying out and gathering in the cable 16 as the locomotive moves away from or towards the point of connection of the cable 16 to the trolley conductor 15, on either side thereof. As shown in Fig. 3, the cable reel 18 may be provided with a suitable motor 20 which may be operatively connected thereto for supplying a driving torque to the reel.

Since under many operating conditions the locomotive may operate along a track from one side of the point of attachment of the cable 16 to the trolley conductor 15 to the other, it is desirable to provide some means for controlling the operation of the cable reel motor 20 so as to change the torque of the motor whenever the locomotive passes the point of attachment of the cable to the trolley conductor, and provide for changing from a "gathering" to a "paying out" condition of operation. For this purpose, as shown in Figs. 1 through 3, a control switch 22 may be utilized and having associated therewith an operating arm 23 which may be pivotally mounted on the frame of the locomotive, and adapted to be actuated from one position to another as the locomotive passes the point of attachment of the cable 16.

The switch 22 may be provided with an operating cam 25 disposed to be engaged by a depending ear 26 on the operating arm 23. A cable guide 27 may be provided at the free end of the arm 23 through which the cable passes. The operating position of the switch 22 may thereby be changed whenever the locomotive passes the point of attachment of the cable to the conductor 15, since the angular position of the cable relative to the reel changes as the locomotive passes the point of attachment, thus swinging the arm 23 from the position in which it is shown in full to the other operating position such as is shown in dotted outline in Fig. 2. The cam 25 on the switch 22 is thereby actuated to a different operating position as shown by the dotted outline, changing the operating position of the switch.

Referring to Fig. 4, it will be seen that the cable reel motor 20 may be of the series type having an armature 30, one terminal of which is connected through a series field winding 31 to ground, and the other terminal through a control resistor 32 and a slip ring 33 to the cable 16 and trolley conductor 15. The connection of the reel motor 20 to the slip ring 33 may be controlled by a switch 34, having an operating winding 35 and a suitable control switch 36. Variation of the reel motor torque may be effected by a control switch 38 having an operating winding 39 for actuating the switch to short circuit a portion of the control resistor 32.

In order to provide for varying the torque of the reel motor 20, as the locomotive changes its direction of operation, when on either side of the point of connection of the cable 16 to the conductor 15, the main motor controller 14 may be provided with auxiliary forward and reverse contact members 40 and 41. These contact members may be so arranged that the torque of the reel motor 20 is controlled by the control switch 38 so as to be at a reduced value whenever the locomotive is moving away from the point of attachment of the cable 16 on one side or the other thereof. The control switch 22 may be provided with movable contact members 44 and 45 for controlling the connection of the operating winding 39 to the source so that the torque of the motor 20 is reduced whenever the locomotive passes the point of attachment in such a direction that the reel changes from a gathering to a paying out operating condition.

The reel motor 20 may be initially energized by closing the control switch 36 to energize the operating winding of switch 34 over a circuit extending from ground through conductor 37, winding 35, conductor 50, control switch 36, conductors 52 and 53, slip ring 33 and cable 16 to conductor 15. The closure of switch 34 connects motor 20 to conductor 15 through slip ring 33 and cable 16.

When the main motor controller 14 is actuated to the forward position with the control switch 22 in the position shown, the operating winding 39 of the control switch 38 is energized through the circuit extending from ground through the operating winding 39, conductor 47, contact member 44, conductor 48, the forward contact member of the main motor controller 14, conductor 49, conductor 50, switch 36, conductors 52 and 53, slip ring 33 and cable 16 to the trolley conductor 15. The control switch 38 closes, shunting a portion of the resistor 32 so that the torque of the motor 20 is increased and it operates to gather the cable as the locomotive moves toward the source.

Should the locomotive continue to move in the same direction from the one side of the point of attachment of the cable 16 to the other, the switch arm 23 will be operated to the dotted position as the angular relation of the cable 16 relative to the reel 18 changes. The control switch 22 will be thereby operated to a different operating position so that the energizing circuit for the operating winding 39 of the control switch 38 must now be completed through the contact member 45 of the control switch 22. Since the main motor controller will not have been changed from the forward operating position it occupied while the locomotive was approaching the point of attachment of the cable from the one side, operation of the control switch 22 interrupts the energizing circuit for the operating winding 39 of the switch 38. The switch 38 opens, removing the shunt from the right-hand portion of the control resistor 32. This decreases the torque of the reel motor 20 so that cable 16 may now be paid out as the locomotive operates away from a point of attachment on the other side thereof without placing too much tension thereon. Any change of direction of the locomotive through operation of the main motor controller 14 automatically sets up the proper operating condition, so that if the direction of operation of the locomotive is now reversed so that it travels back towards the point of attachment of the cable 16, an energizing circuit will be provided for the operating winding 39 of the switch 38 through the main motor controller, thus increasing the torque of the reel motor so as to provide for winding or gathering in the cable 16 and maintaining the desired tension thereon.

From the above description and the accompanying drawing, it will be apparent that I have provided in a simple and inexpensive manner for automatically controlling the tension of the cable in a cable-operated vehicle. Operation of the locomotive on opposite sides of the point of attachment of the cable to the source may be readily effected without subjecting the cable to excessive tension. By controlling the operation of the reel motor through both the main motor controller and through a cable direction responsive control switch, operation of the locomotive may be secured in both directions on either side of a point of attachment of the cable, and the reel motor may be made to produce the proper torque under all conditions for maintaining the desired tension in the cable.

Since certain changes may be made in the above description and different embodiments of the invention may be made without departing from the spirit thereof, it is intended that all the matter contained in the above description or shown in the accompanying drawing shall be considered as illustrative and not in a limiting sense.

I claim as my invention:

1. A control system for a motor operating a cable reel on a vehicle for a cable supplying electrical energy to the vehicle comprising, means operable to vary the torque of the cable reel motor, and means responsive to the angular direction of the cable relative to the reel operable to control the torque varying means.

2. In a control system for a torque motor operatively connected to a cable reel for a power cable supplying electrical energy to a vehicle, switch means operable to vary the armature current of the torque motor, and control means responsive to a change in the angular relation of the cable to the reel operable to effect operation of the switch means.

3. A control system for a cable reel motor on a vehicle having a cable for supplying electrical energy through a controller to a motor for operating the vehicle comprising, switch means operable to vary the torque of the reel motor, a control switch operable to different positions in response to changes in the angular relation of the cable to the reel, control means associated with the controller, and circuit means connecting the control means and the control switch for operating the switch means selectively in accordance with the direction of motion of the vehicle relative to the point of attachment of the cable to a source of electrical energy.

4. A control system for a motor operating a cable reel on a vehicle having a main driving motor disposed to be energized from a source of electrical energy through a cable carried by the reel comprising, circuit means connecting the cable reel motor to the cable, control means operable to vary the impedance of the circuit means, and means for effecting operation of the switch means whenever the vehicle passes the point of attachment of the cable to the source including a movable arm actuated by the cable in accordance with a change in the angular relation of the cable to the reel.

5. A control system for a motor operating a reel for a cable disposed to be attached to a source of electrical energy for supplying electrical energy to a driving motor of a vehicle through a controller comprising, control means operable to change the torque of the reel motor, means associated with the controller operable to reduce the torque of the reel motor when the vehicle moves away from the point of attachment of the cable to the source on one side thereof, and means operable to reduce the torque of the reel motor as the vehicle moves away from the one side of the point of attachment to the other side.

6. The combination in a control system for a motor operating a reel mounted upon a vehicle for carrying a cable disposed to be attached to a source of electrical energy for supplying electrical energy to the vehicle, of a control impedance, switch means for connecting the impedance in series circuit relation with the reel motor, and control means including a movable switch arm operable to different positions depending upon which side of the point of attachment of the cable the vehicle is operating for effecting operation of the switch means as the vehicle passes the point of attachment of the cable to the source.

7. In a control system for a motor operating a cable reel on a vehicle for supplying electrical energy to the vehicle from a power source, in combination, control means operable to vary the torque of the reel motor, and a pivotal arm actuable to different positions to effect operation of the switch means, said arm having a guide member for receiving the cable and being actuable to different positions depending on changes in the angular relation of the cable with the reel as the vehicle moves from one side of the point of attachment of the cable to the other.

8. In combination, a reel mounted on a vehicle and carrying a cable disposed to be attached to a source of electrical energy for supplying electrical energy to the vehicle, a driving motor for operating the vehicle, a reel motor for operating the reel, control means operable to vary the torque of the reel motor, a controller for the vehicle driving motor having contact means operatively associated therewith for affecting operation of said control means whenever the vehicle driving motor is reversed, and additional control means responsive to the position of the vehicle relative to the point of attachment of the cable to the source for operating the control means whenever the vehicle passes the point of attachment, thereby to maintain a substantially constant tension on the cable.

9. In a cable reel system, in combination, a cable reel having an operating motor, control means operable to increase the torque of the reel motor, switch means operable to effect operation of the control means, and means comprising a pivotal arm having a guide for receiving the cable adjacent the free end for effecting operation of the switch means whenever the vehicle passes the point of attachment of the cable and the cable changes its angular relation with the reel.

10. A control system for a motor operating a cable reel on a vehicle having a driving motor energized through the cable from a source of electrical energy and control means for the motor comprising, a control resistor connected in series circuit relation with the reel motor, switch means operable to shunt a portion of the resistor, circuit means connected between the control means and the source for effecting operation of the switch means whenever the direction of travel of the vehicle is changed by the control means, and additional control means including a switch operated in response to passage of the vehicle past the point of attachment of the cable associated with the control means for operating the circuit means whenever the vehicle passes the point of attachment.

11. A control system for a motor operating a cable reel on a vehicle having a driving motor energized under the control of a controller through a cable carried on the reel and connected to a source of electrical energy comprising, a control resistor connected in series circuit relation with the reel motor, control switch means operable to control the connection of the control resistor in the circuit, contact means associated with the controller for controlling the operation of the control switch means in accordance with the direction of movement of the vehicle, and switch means including a pivotal arm having a guide for receiving the cable at the free end and controlling the operation of the control switch means in accordance with whichever side of the point of attachment of the cable the vehicle is operating on.

HERMAN C. KRAPF.